United States Patent
Lee et al.

(10) Patent No.: US 9,597,639 B2
(45) Date of Patent: Mar. 21, 2017

(54) HOLLOW FIBER MEMBRANE MODULE, FILTRATION APPARATUS USING THE SAME, AND METHOD FOR MANUFACTURING THE FILTRATION APPARATUS

(71) Applicant: KOLON INDUSTRIES, INC., Kwacheon-si, Kyunggi-do (KR)

(72) Inventors: Kwang-Jin Lee, Yongin-si (KR); Moo-Seok Lee, Seoul (KR)

(73) Assignee: KOLON INDUSTRIES, INC., Kwacheon-si (KR)

( * ) Notice: Subject to any disclaimer, the term of this patent is extended or adjusted under 35 U.S.C. 154(b) by 175 days.

(21) Appl. No.: 14/573,086

(22) Filed: Dec. 17, 2014

(65) Prior Publication Data

US 2015/0101976 A1    Apr. 16, 2015

Related U.S. Application Data

(62) Division of application No. 13/258,610, filed as application No. PCT/KR2010/001775 on Mar. 23, 2010, now Pat. No. 8,956,537.

(30) Foreign Application Priority Data

Mar. 23, 2009   (KR) .......................... 10-2009-0024451

(51) Int. Cl.
   *B01D 63/02*   (2006.01)
   *B01D 65/00*   (2006.01)

(52) U.S. Cl.
   CPC ........... *B01D 63/02* (2013.01); *B01D 63/026* (2013.01); *B01D 65/00* (2013.01);
   (Continued)

(58) Field of Classification Search
   CPC ............ B01D 2313/02; B01D 2313/06; B01D 2313/12; B01D 2313/21; B01D 2315/06;
   (Continued)

(56) References Cited

U.S. PATENT DOCUMENTS

| 6,645,381 B2 * | 11/2003 | McEvoy | ................ B01D 61/38 |
| | | | 210/321.78 |
| 6,783,008 B2 * | 8/2004 | Zha | ........................ B01D 63/02 |
| | | | 210/232 |

(Continued)

FOREIGN PATENT DOCUMENTS

| JP | 9-99222 A | 4/1997 |
| JP | 11-244674 A | 9/1999 |

(Continued)

*Primary Examiner* — John Kim
(74) *Attorney, Agent, or Firm* — Birch, Stewart, Kolasch & Birch, LLP

(57) ABSTRACT

Disclosed are a hollow fiber membrane module, a filtration apparatus based on the same, and a method for manufacturing the filtration apparatus. The hollow fiber membrane module includes two headers respectively provided with a permeate collecting unit therein, wherein each of the headers has grooves on its two sides, the grooves being extended in a length direction of the hollow fiber membrane. Since one slide rod can simultaneously be inserted into grooves of two adjacent hollow fiber membrane modules, the hollow fiber membrane modules can mutually serve as guides for insertion/ejection thereof. Also, since the grooves formed on the header can serve as insertion holes into which a clamp is inserted, the clamp can be used for coupling between the hollow fiber membrane module and another element and reinforcement of the coupling.

8 Claims, 5 Drawing Sheets

(52) U.S. Cl.
CPC ...... *B01D 2313/02* (2013.01); *B01D 2313/06* (2013.01); *B01D 2313/12* (2013.01); *B01D 2313/21* (2013.01); *B01D 2315/06* (2013.01); *Y10T 29/49826* (2015.01)

(58) Field of Classification Search
CPC ...... B01D 63/02; B01D 63/026; B01D 65/00; Y10T 29/49826
See application file for complete search history.

(56) References Cited

U.S. PATENT DOCUMENTS

| | | | |
|---|---|---|---|
| 2007/0125697 A1 | 6/2007 | Lee et al. | |
| 2010/0258492 A1* | 10/2010 | Kang | B01D 63/02 210/232 |
| 2011/0024345 A1* | 2/2011 | Lee | B01D 63/02 210/237 |

FOREIGN PATENT DOCUMENTS

| | | |
|---|---|---|
| KR | 10-0569681 B1 | 4/2006 |
| KR | 10-0624154 B1 | 9/2006 |

* cited by examiner

HOLLOW FIBER MEMBRANE MODULE, FILTRATION APPARATUS USING THE SAME, AND METHOD FOR MANUFACTURING THE FILTRATION APPARATUS

This application is a Divisional of co-pending application Ser. No. 13/258,610 filed on Nov. 30, 2011, which is the U.S. National Phase of PCT/KR2010/001775, filed Mar. 23, 2010, and which claims priority to Application No. 10-2009-0024451 filed in Korea, on Mar. 23, 2009. The entire contents of all of the above applications are hereby incorporated by reference.

TECHNICAL FIELD

The present invention relates to a hollow fiber membrane module, a filtration apparatus using the same, and a method for manufacturing the filtration apparatus, and more particularly, to a hollow fiber membrane module, a filtration apparatus using the same, and a method for manufacturing the filtration apparatus, in which the hollow fiber membrane module can be provided with insertion/ejection paths from an adjacent hollow fiber membrane module when it is inserted into/ejected from a frame structure and can provide the insertion/ejection paths to the adjacent hollow fiber membrane module inserted into/ejected from the frame structure.

BACKGROUND ART

A separation method using a membrane has lots of advantages over the method based on heating or phase-changing. One of the advantages is high reliability of water treatment since the water purity required can be easily and stably satisfied by adjusting the size of the pores of a membrane. Furthermore, since the separation method using a membrane does not require a heating process, the membrane can be used with microorganism which is useful for a separation process but may be adversely affected by heat.

One of the separation methods using a membrane is a separation method using a hollow fiber membrane module provided with a bundle of hollow fiber membranes. Conventionally, although the hollow fiber membrane module has been widely used in the field of precision filtration such as manufacture of axenic water, drinking water, and ultrapure water, its application range has been recently extended to sewage/waste water treatment, sludge separation from a septic tank, removal of suspended solid (SS) from industrial waste water, filtration of stream water, filtration of industrial water, filtration of pool water, and the like.

One kind of the hollow fiber membrane modules is a suction type hollow fiber membrane module which is submerged into a water tank filled with a fluid to be treated. A negative pressure is applied to the inside of the hollow fiber membranes, whereby only a fluid passes through the wall of each membrane and solid elements such as impurities and sludge are rejected. This suction type hollow fiber membrane module is advantageous in that the manufacturing cost is relatively low and that the installation and maintenance cost is reduced since a facility for circulating a fluid is not required.

In case of such a suction type hollow fiber membrane module, several hollow fiber membrane modules are inserted into a frame structure in due order to form a cassette type. Afterwards, this cassette is submerged into a liquid substrate having contaminant materials including solid elements, whereby a filtering treatment is carried out. At this time, as a water treatment is carried out, membrane contamination is caused by the contaminant materials. As a result, a problem occurs in that permeable performance of the membrane is remarkably deteriorated. Accordingly, in order to maintain permeable performance of the membrane at a good state while a water treatment is being carried out by the hollow fiber membrane, rising air bubbles are generated through the air jetted from an aeration pipe positioned under the hollow fiber membrane modules, whereby impurities are removed from a surface of the hollow fiber membrane.

Meanwhile, since the air is strongly jetted from the aeration pipe when the aeration process is carried out, the hollow fiber membrane modules are subjected to serious vibration. The hollow fiber membrane modules may be damaged by such vibration. Accordingly, a plurality of hollow fiber membrane modules constituting one cassette are tightly adhered to one another. However, if the plurality of hollow fiber membrane modules are tightly adhered to one another, damage of the hollow fiber membrane modules due to collision among them may be reduced but vibration of a bundle of hollow fiber membranes ported in each hollow fiber membrane module may still occur. Also, the hollow fiber membranes may still be damaged due to their vibration. If it is required that a specific hollow fiber membrane module should be exchanged with a new one or should be repaired due to its damage, after the corresponding one of the plurality of hollow fiber membrane modules tightly adhered to one another is ejected, it is repaired or exchanged with a new one, whereby the repaired one or new one is inserted into the corresponding position.

As described above, when a plurality of hollow fiber membrane modules are inserted into a filtration apparatus in due order to form a cassette, when a specific one of the plurality of hollow fiber membrane modules is ejected from a frame structure to repair it, and when the repaired one is again inserted into the filtration apparatus, the filtration apparatus according to the related art has much difficulty because no guide module providing insertion/ejection paths of the hollow fiber membrane exists.

The current trend is towards a large scaled hollow fiber membrane module to increase capacity of a water treatment. In this respect, a problem occurs in that difficulty in inserting/ejecting the hollow fiber membrane module into/from the frame structure becomes more serious. Particularly, in case of a horizontal hollow fiber membrane module in which a length direction of the hollow fiber membrane is parallel with an insertion and ejection direction of the hollow fiber membrane module, the above problem becomes more serious.

DISCLOSURE

Technical Problem

Therefore, the present invention is directed to a hollow fiber membrane module, a filtration apparatus based on the same, and a method for manufacturing the filtration apparatus, which substantially obviate one or more of the problems due to limitations and disadvantages of the related art.

An aspect of the present invention is to provide a hollow fiber membrane module and a method for manufacturing a filtration apparatus using the same, in which the hollow fiber membrane module can be provided with insertion/ejection paths from an adjacent hollow fiber membrane module when it is inserted into/ejected from a frame structure and can provide the insertion/ejection paths to the adjacent hollow fiber membrane module inserted into/ejected from the frame structure.

Another aspect of the present invention is to provide a hollow fiber membrane module and a filtration apparatus using the same, which can improve convenience of the manufacture and economics.

Still another aspect of the present invention is to provide a hollow fiber membrane module and a filtration apparatus using the same, of which convenience and durability in use are remarkably improved by a clamp used for coupling and/or reinforcement of coupling when the hollow fiber membrane module is coupled with another element.

Further still another aspect of the present invention is to provide a hollow fiber membrane module and a filtration apparatus using the same, of which durability is remarkably improved as adjacent hollow fiber membrane modules are supported by each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided a hollow fiber membrane module comprising first and second headers respectively provided with a permeate collecting unit therein; and a bundle of hollow fiber membranes between the first and second headers, both ends of the hollow fiber membranes being respectively potted in potting surfaces of the headers facing to each other such that the hollow fiber membranes are in fluid communication with the permeate collecting units, wherein each of the headers has first and second sides adjacent to the potting surface and opposite to each other, and wherein grooves extended in a length direction of the hollow fiber membrane are formed on the first and second sides.

In another aspect of the present invention, there is provided a filtration apparatus comprising a hollow fiber membrane module including a header having a projecting port for discharging out permeate water in a permeate collecting unit and a bundle of hollow fiber membranes of which ends are potted in potting surface of the header so that the hollow fiber membranes are in fluid communication with the permeate collecting unit; and a unit pipe providing a pathway for the permeate water discharged from the projecting port, the projecting port being inserted into the unit pipe, wherein the header has first and second sides adjacent to the potting surfaces and opposite to each other, and wherein grooves extended in a length direction of the hollow fiber membranes are formed on the first and second sides.

In still another aspect of the present invention, there is provided a filtration apparatus comprising a first hollow fiber membrane module having a first header provided with a first groove; a second hollow fiber membrane module having a second header provided with a second groove; and a slide rod, wherein the slide rod includes a first main body inserted into the first groove, a second main body inserted into the second groove, and a link unit positioned between the first and second main bodies.

In further still another aspect of the present invention, there is provided a method for manufacturing a filtration apparatus, the method comprising inserting a second hollow fiber membrane module having a second header provided with a second groove into a frame having therein a first hollow fiber membrane module having a first header provided with a first groove, wherein a slide rod includes a first main body, a second main body, and a link unit positioned between the first and second main bodies, the first main body being inserted into the first groove of the first hollow fiber membrane module, and wherein the inserting the second hollow fiber membrane module includes inserting the second hollow fiber membrane module into the frame under the guide of the second groove in such a manner that the second main body of the slide rod is inserted into the second groove of the second hollow fiber membrane module.

It is to be understood that both the foregoing general description and the following detailed description are exemplary and explanatory and are intended to provide further explanation of the invention as claimed.

Advantageous Effects

According to a hollow fiber membrane module, a filtration apparatus based on the same, and a method for manufacturing the filtration apparatus of the present invention, since hollow fiber membrane modules serve as guides for insertion/ejection for one another when they are inserted into/ejected from a frame structure, it facilitates exchange and repair of a specific hollow fiber membrane as well as manufacture of the filtration apparatus.

Also, since two headers constituting one hollow fiber membrane module can be manufactured by one mold, the manufacture is convenient and the manufacturing cost can be reduced.

Also, since grooves formed in a header of the hollow fiber membrane module can serve as spaces for insertion of a clamp, the clamp can be used for coupling and/or reinforcement of the coupling when the hollow fiber membrane module is coupled with another element, for example, unit pipe. As a result, convenience in manufacture and durability of the filtration apparatus can be improved more remarkably than forcible coupling using a bolt.

Finally, since adjacent hollow fiber membrane modules are supported by each other through a slide rod, durability of the filtration apparatus may be improved remarkably.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a filtration apparatus according to one embodiment of the present invention will be described with reference to the accompanying drawings.

For the following description of the present invention, a hollow fiber membrane module is illustrated as a filtering membrane module to describe technical spirits of the present invention. However, it is to be understood that the present invention it is not limited to the hollow fiber membrane module. For example, the present invention may be applied to various kinds of filtering membrane modules including a flat-type module.

Figure 1:
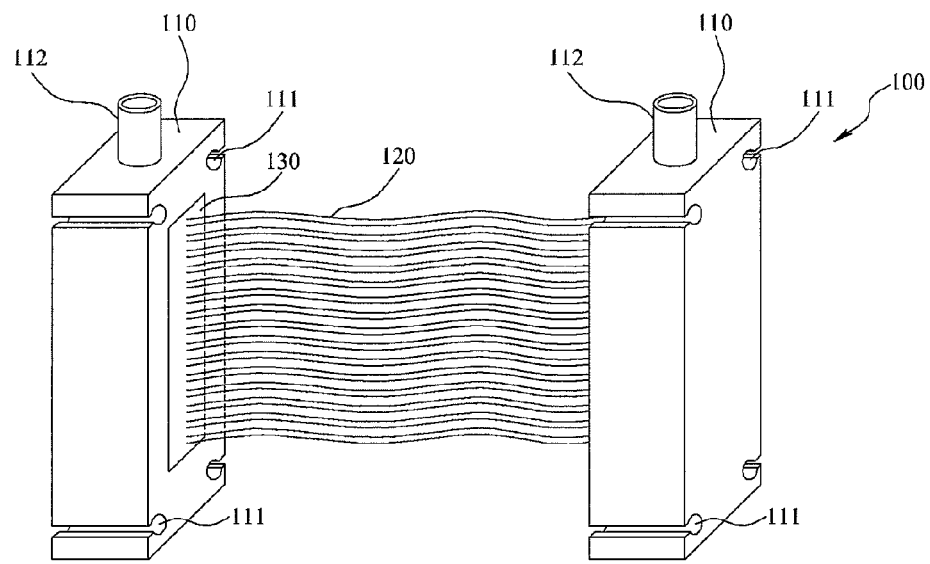
FIG. 1 and FIG. 2 are a perspective view and a front view briefly illustrating a hollow fiber membrane module according to one embodiment of the present invention.
Figure 2:
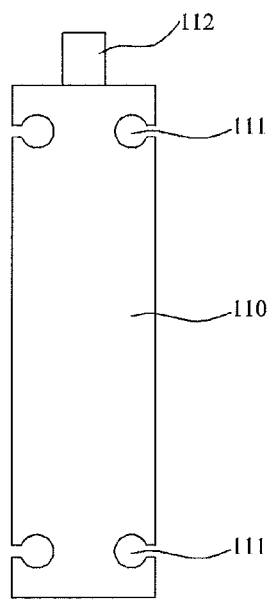

FIG. 1 and FIG. 2 are a perspective view and a front view briefly illustrating a hollow fiber membrane module according to one embodiment of the present invention.

As shown in FIG. 1, the hollow fiber membrane module 100 according to one embodiment of the present invention includes a bundle of hollow fiber membranes 120 arranged between two headers 110. Both ends of the hollow fiber membranes 120 are potted on the potting surfaces of the two headers 110 facing to each other through an adhesive unit 130 formed of polyurethane and the like.

Permeate collecting units (not shown) connected with open ends of the hollow fiber membranes 120 through a fluid are respectively formed within the headers 110. The permeate water passed through the hollow fiber membranes 120 by a negative pressure applied to the inside of the hollow fiber membranes 120 is primarily collected in the permeate collecting unit. Each of the headers 110 further includes a projecting port 112 for discharging out the permeate water generated by the bundle of hollow fiber membranes 120 and collected in the permeate collecting units.

One embodiment of the present invention shown in FIG. 1 and FIG. 2 is directed to a horizontal hollow fiber membrane module 100. When the hollow fiber membrane module 100 is submerged into a liquid substrate to be treated, the two headers 110 are positioned in such a manner that their length direction is vertical to the surface of the water, and the hollow fiber membranes 120 are arranged in parallel with the surface of the water.

According to the present invention, each of the headers 110 has grooves 111 on its two sides opposite to each other and adjacent to the potting surface, the grooves 111 being extended in a length direction of the hollow fiber membranes 120. According to one embodiment of the present invention shown in FIG. 1 and FIG. 2, one header 110 has two pairs of grooves 111 respectively formed on its upper and lower portions. However, the number of the pairs of grooves 111 and the position of the grooves 111 formed on the header 110 may be selected appropriately depending on factors such as the size of the hollow fiber membrane module 100.

Figure 3:
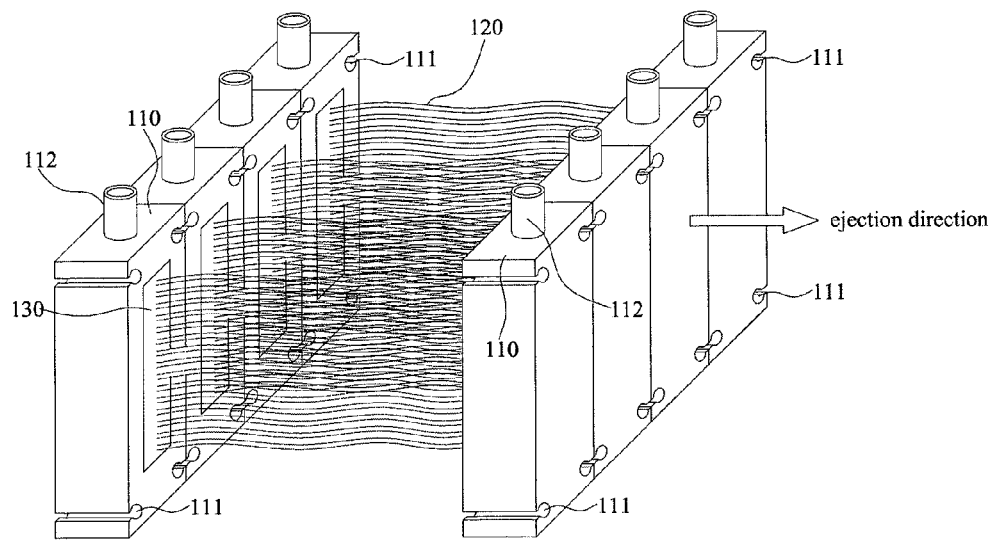
FIG. 3 and FIG. 4 are a perspective view and a front view briefly illustrating hollow fiber membrane modules according to one embodiment of the present invention, which are coupled to a frame structure to form one cassette.
Figure 4:
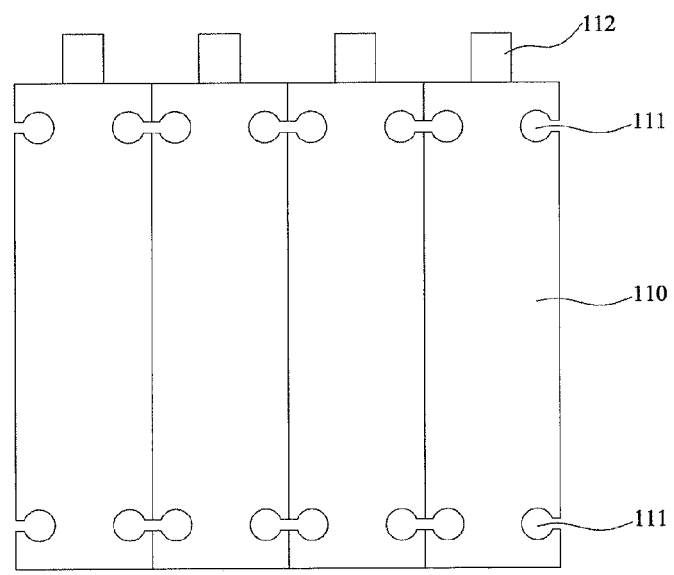

FIG. 3 and FIG. 4 are a perspective view and a front view briefly illustrating hollow fiber membrane modules according to one embodiment of the present invention, which are coupled to a frame structure to form one cassette.

The filtration apparatus of the present invention carries out filtering after the hollow fiber membrane modules 100 are submerged into the liquid substrate with contaminants including solid elements in a state that they are coupled to the frame structure (not shown). At this time, membrane contamination is caused by the contaminants as the water treatment is carried out. For this reason, a problem occurs in that permeable performance of the hollow fiber membrane 120 is remarkably deteriorated. In order to maintain permeable performance of the hollow fiber membrane 120 at a good state while the water treatment is being carried out by the hollow fiber membrane 120, rising air bubbles are generated by the air jetted from an aeration pipe (not shown) positioned under the hollow fiber membrane modules 100 during the water treatment, whereby impurities are removed from the surface of the hollow fiber membrane 120.

Meanwhile, since the air is strongly jetted from the aeration pipe during the aeration process, serious vibration is applied to each of the hollow fiber membrane modules 100, whereby the hollow fiber membrane modules 100 may be damaged due to mutual collision caused by such a vibration. In order to reduce the damage of the hollow fiber membrane modules 100, the plurality of hollow fiber membrane modules 100 of the filtration apparatus according to the present invention are tightly adhered to one another as shown in FIG. 3 and FIG. 4.

However, as the plurality of hollow fiber membrane modules 100 are tightly adhered to one another, although damage due to their collision may be reduced, vibration of the bundle of hollow fiber membranes 120 potted in each hollow fiber membrane module 100 and damage of the hollow fiber membrane 120 due to the vibration may still exist. If a specific hollow fiber membrane module 100 should be exchanged with another new one or should be repaired due to damage of the hollow fiber membrane 120, only the corresponding hollow fiber membrane module 100 of the plurality of hollow fiber membrane modules 100 tightly adhered to one another should be ejected from the frame structure. In case of the horizontal hollow fiber membrane module 100, its ejection direction is parallel with the length direction of the hollow fiber membrane 120.

Also, if the plurality of horizontal hollow fiber membrane modules 100 are inserted into the frame structure in due order to form a cassette, or if the repaired hollow fiber membrane module or a new hollow fiber membrane module for exchange is inserted into the frame structure, the insertion direction thereof is also parallel with the length direction of the hollow fiber membrane 120.

According to the present invention, when the horizontal hollow fiber membrane modules 100 are inserted into/ejected from the frame structure, they mutually serve as guides for insertion/ejection, as will be described hereinafter in more detail.

Figure 5:
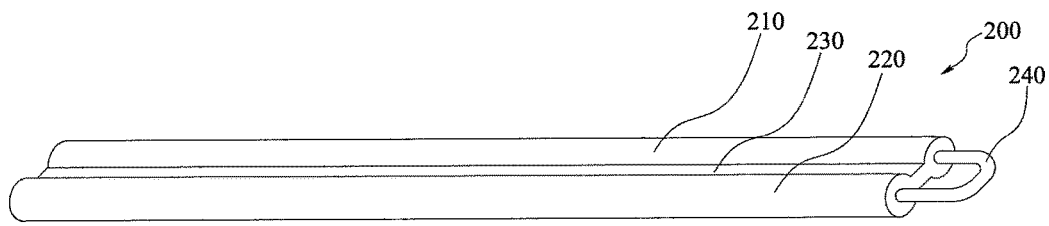
FIG. 5 is a perspective view briefly illustrating a slide rod according to one embodiment of the present invention.

FIG. 5 is a perspective view briefly illustrating a slide rod according to one embodiment of the present invention.

As shown in FIG. 5, the slide rod 200 of the present invention includes first and second main bodies 210 and 220 parallel with each other in a length direction, and a link unit 230 positioned between the first and second main bodies 210 and 220. Any one of the first and second main bodies 210 and 220 of the slide rod 200 is inserted into the grooves 111 formed on the sides of the headers 110 of the hollow fiber membrane module 100, and the other one is inserted into the groove of the adjacent hollow fiber membrane module. In order to easily eject the slide rod 200, of which one end is inserted into the groove 111, from the hollow fiber membrane module 100, as shown in FIG. 5, the slide rod 200 of the present invention may further include a handle 240 coupled with its one end.

Figure 6:
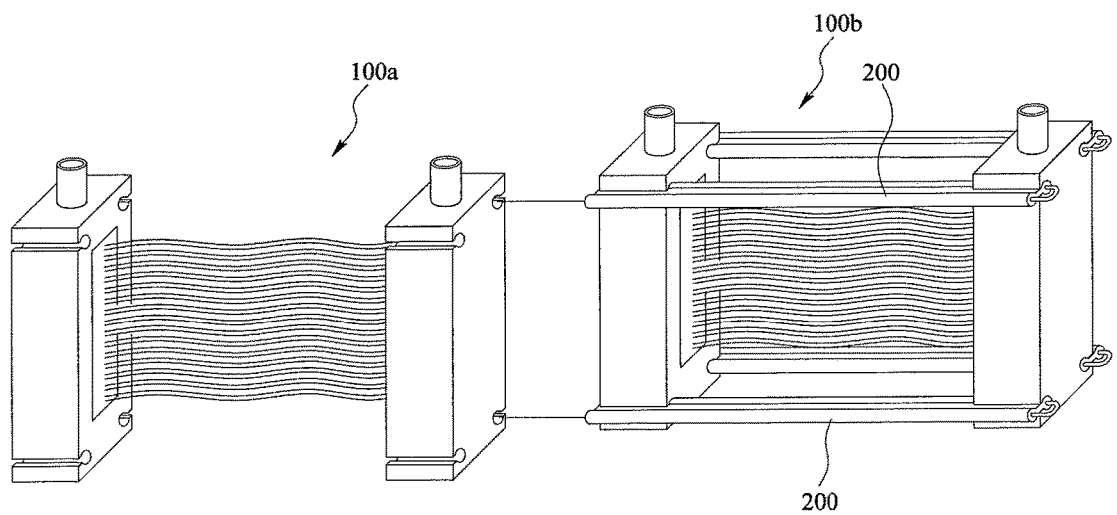
FIG. 6 is a diagram illustrating a hollow fiber membrane module guided from an adjacent hollow fiber membrane module when it is inserted into/ejected from a frame structure in accordance with one embodiment of the present invention.

FIG. 6 is a diagram illustrating a hollow fiber membrane module guided from an adjacent hollow fiber membrane module when it is inserted into/ejected from a frame structure in accordance with one embodiment of the present invention.

As shown in FIG. 6, after a first hollow fiber membrane module 100a is inserted into the frame, a second hollow fiber membrane module 100b may be guided from the first hollow fiber membrane module 100a when it is inserted into the frame. Similarly, when the second hollow fiber membrane module 100b is ejected from the frame structure in a state that the first and second hollow fiber membrane modules 100a and 100b are inserted into the frame structure, the second hollow fiber membrane module 100b may be guided from the first hollow fiber membrane module 100a.

In more detail, each of the first and second hollow fiber membrane modules 100a and 100b includes two headers and a bundle of hollow fiber membranes between the headers. Grooves extended in a length direction of the hollow fiber membrane are formed on the sides of the headers. Each of the headers of the first and second hollow fiber membrane modules 100a and 100b shown in FIG. 6 includes a total of four grooves formed on upper and lower portions of two sides.

After the first hollow fiber membrane module 100a is inserted into the frame, the second hollow fiber membrane module 100b and the slide rods 200 are prepared. Each of the slide rods 200 includes a first main body 210, a second main body 220, and a link unit 230 positioned between the first and second main bodies 210 and 220. The slide rod 200 may be provided with a handle 240 at its one end. The second main bodies 220 of the slide rods 200 are inserted into the corresponding grooves formed on the sides of two headers of the second hollow fiber membrane module 100b in due order. If each of the headers includes a total of four grooves as shown in FIG. 6, a total of four slide rods 200 are inserted into the grooves of the second hollow fiber membrane module 100b.

When the second hollow fiber membrane module 100b into which the slide rods 200 are inserted is inserted into the frame structure, the first main body 210 of the slide rod 200 is inserted into corresponding grooves of the first hollow fiber membrane module 100a in a sliding mode, whereby the second hollow fiber membrane module 100b can be inserted into the frame structure under the guide of the grooves. Similarly, even when the second hollow fiber membrane module 100b is ejected from the frame structure, the slide rod 200 is also ejected from the frame structure together with the second hollow fiber membrane module 100b, whereby the second hollow fiber membrane module 100b may be guided from the grooves of the first hollow fiber membrane module 100a.

Selectively, in a state that the first main body 210 of each slide rod 200 is inserted into each of the grooves of the first hollow fiber membrane module 100a inserted into the frame structure, the second hollow fiber membrane module 100b may be inserted into the frame. In this case, the second main body 220 of the slide rod 200 is inserted into each of corresponding grooves of the second hollow fiber membrane module 100b in a sliding mode, whereby the second hollow fiber membrane module 100b can be inserted into the frame structure under the guide of the second main body of the slide rod 200. Likewise, even when the second hollow fiber membrane module 100b is ejected from the frame structure, it can be ejected from the frame structure under the guide of the second main body of the slide rod 200.

Figure 7:
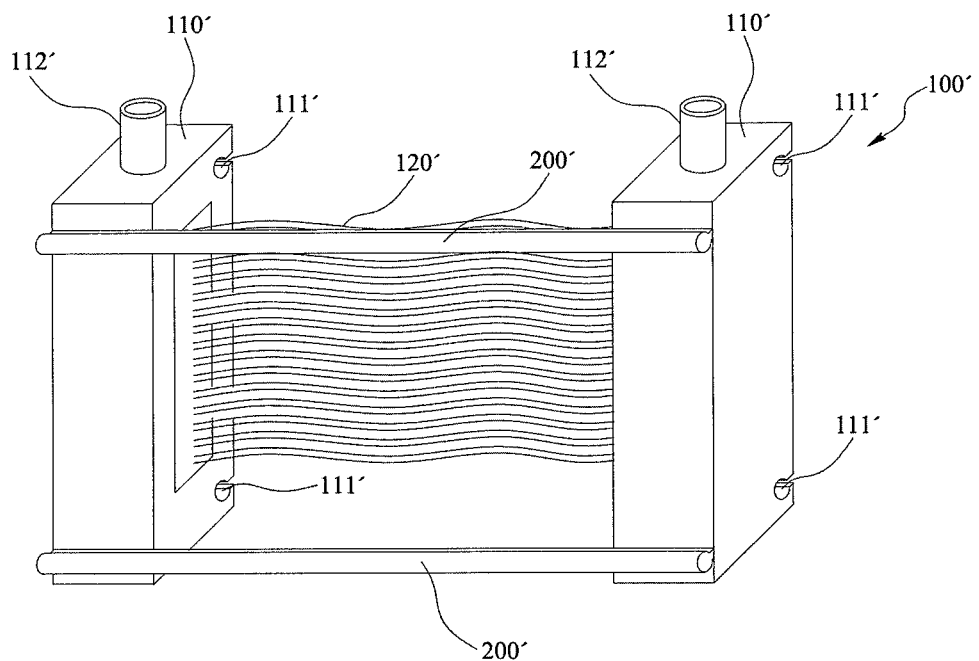
FIG. 7 and FIG. 8 are a perspective view and a front view briefly illustrating a hollow fiber membrane module according to another embodiment of the present invention.
Figure 8:
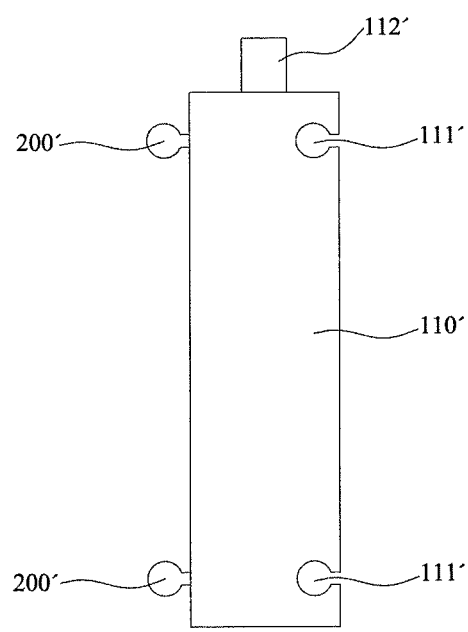

FIG. 7 and FIG. 8 are a perspective view and a front view briefly illustrating a hollow fiber membrane module according to another embodiment of the present invention.

As shown in FIG. 7 and FIG. 8, according to another embodiment of the present invention, a groove 111' is formed only at one side of each of headers 110' of hollow fiber membrane modules 100', and one horizontal rod 200' is coupled to each of opposite sides of the headers 110'. In this embodiment, the horizontal rod 200' of the hollow fiber membrane module 100' is inserted into or ejected from the groove formed on a side of a header of an adjacent hollow fiber membrane module in a sliding mode, whereby the hollow fiber membrane modules may be guided from each other with respect to a path for insertion/ejection.

However, since the groove 111' is formed only at one side of header 110' of the hollow fiber membrane module 100' shown in FIG. 7 and FIG. 8, a problem occurs in that two headers 110' constituting one hollow fiber membrane module 100' cannot be manufactured using the same mold. In other words, considering that the manufacturing process can be simplified and the manufacturing cost can be reduced when two headers 110 of the hollow fiber membrane module 100 are manufactured using the same mold, it is preferable that the grooves 111 are formed on both sides of the header 110 and a separate slide rod 200 that can be inserted into/ejected from the grooves 111 in a sliding mode is used.

Meanwhile, after the first and second hollow fiber membrane modules 100a and 100b are inserted into the frame structure using the separate slide rod 200, the slide rod 200 is maintained in a state that it is inserted into the grooves of the first and second hollow fiber membrane modules 100a and 100b. As a result, the first and second hollow fiber membrane modules 100a and 100b can be supported by each other during filtering operation and their collision can be avoided.

Selectively, according to another embodiment of the present invention, after the hollow fiber membrane modules 100 are inserted into the frame structure, the slide rod 200 is removed from the hollow fiber membrane module 100 and the grooves 111 formed on both sides of the header 110 may be used for coupling between the hollow fiber membrane module 100 and a unit pipe 300. Hereinafter, coupling between the hollow fiber membrane module 100 and the unit pipe 300 will be described in more detail.

Figure 9:
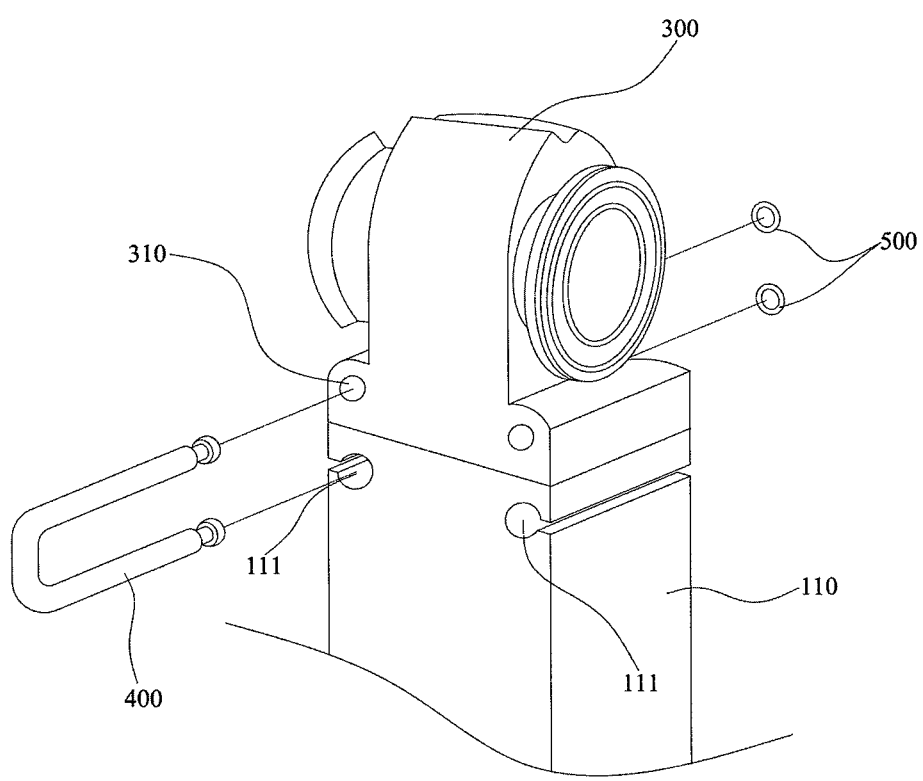
FIG. 9 is a diagram briefly illustrating coupling between a hollow fiber membrane module and a unit pipe according to one embodiment of the present invention.

FIG. 9 is a diagram briefly illustrating coupling between a hollow fiber membrane module and a unit pipe according to one embodiment of the present invention.

In order to provide a pathway of the permeate water discharged from the projecting port 112 of the hollow fiber membrane module 100, the filtration apparatus of the present invention further includes a unit pipe 300 into which the projecting port 112 is inserted. Each header 110 of the hollow fiber membrane module has its corresponding unit pipe 300. The respective unit pipes 300 are connected with each other to constitute one pipe. Through holes 310 corresponding to the grooves 111 of the header 110 of the hollow fiber membrane module 100 are formed in the unit pipe 300.

The filtration apparatus of the present invention further includes a clamp 400 inserted into the groove 111 of the header 110 and the through holes 310 of the unit pipe 300.

The groove 111 of the header 110, which has served as a guide through the slide rod 200 when the hollow fiber membrane module 100 has been inserted into/ejected from the frame structure, serves as an insertion groove of the clamp 400 for coupling between the header 110 and the unit pipe 300.

The clamp 400 is used to reinforce coupling between the header 110 and the unit pipe 300. In addition, the clamp 400 can more increase easiness of coupling and improve durability of the filtration apparatus than that a bolt is used for coupling between the header 110 and the unit pipe 300. If the bolt is used for coupling between the header 110 and the unit pipe 300, it is likely that the header 110 is damaged. By contrast, if the clamp 400 of the present invention is used, since it is not forcible fitting, the header 100 is little damaged.

Selectively, the filtration apparatus of the present invention may further include fixing members 500 respectively fixed to the parts of the clamp 400, which have respectively passed through the groove 111 and the through hole 310, so as to prevent the clamp 400 inserted into the groove 111 of the header 110 and the through hole 310 of the unit pipe 300 from being detached therefrom. The fixing member 500 may be a nut or elastic member.

Meanwhile, although the slide rod 200 and the groove 111 formed on the header 110 have rounded sections as shown in the present invention, various modifications can be made in the sections of the slide rod 200 and the groove 111 if the slide rod 200 can be inserted into and ejected from the groove 111 formed on the header 110 of the hollow fiber membrane module 100 in parallel with its length direction.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A hollow fiber membrane module comprising:
    first and second headers respectively provided with a permeate collecting unit therein; and
    a bundle of hollow fiber membranes between the first and second headers, both ends of the hollow fiber membranes being respectively potted in potting surfaces of the headers facing to each other such that the hollow fiber membranes are in fluid communication with the permeate collecting units,
    wherein each of the headers has first and second sides adjacent to the potting surface and opposite to each other, and
    wherein at least one groove is formed on a surface of each of the first and second sides, the groove having a length direction parallel with a length direction of the hollow fiber membranes.

2. The hollow fiber membrane module according to claim 1, wherein each of the headers includes a projecting port for discharging out permeate water generated by the bundle of hollow fiber membranes and collected in the permeate collecting unit.

3. A filtration apparatus comprising:
    a hollow fiber membrane module including a header having a projecting port for discharging out permeate water in a permeate collecting unit and a bundle of hollow fiber membranes of which ends are potted in potting surface of the header so that the hollow fiber membranes are in fluid communication with the permeate collecting unit; and
    a unit pipe providing a pathway for the permeate water discharged from the projecting port, the projecting port being inserted into the unit pipe,
    wherein the header has first and second sides adjacent to the potting surface and opposite to each other, and
    wherein at least one groove is formed on a surface of each of the first and second sides, the groove having a length direction parallel with a length direction of the hollow fiber membranes.

4. The filtration apparatus according to claim 3, wherein the unit pipe is provided with a through hole.

5. The filtration apparatus according to claim 4, further comprising a clamp inserted into the groove of the header and the through hole of the unit pipe.

6. The filtration apparatus according to claim 5, further comprising a fixing member fixed to a part of the clamp, which has passed through the groove or the through hole, so as to prevent the clamp inserted into the groove of the header and the through hole of the unit pipe from being detached therefrom.

7. The filtration apparatus according to claim 6, wherein the fixing member is a nut.

8. The filtration apparatus according to claim 6, wherein the fixing member is an elastic member.

* * * * *